United States Patent [19]

Funk

[11] Patent Number: 4,511,107

[45] Date of Patent: Apr. 16, 1985

[54] ONE-PIECE CLAMP

[76] Inventor: Richard J. Funk, 393 Valleybrook, Lancaster, Pa. 17601

[21] Appl. No.: 412,235

[22] Filed: Aug. 27, 1982

[51] Int. Cl.³ .............................................. F16L 3/08
[52] U.S. Cl. ...................................... 248/74.1; 248/49
[58] Field of Search ......................... 248/49, 74.1, 74.2, 248/74.3, 68.1, 73; 24/460, 531, 532, 563, 564, 16 R, 533, 546, 509; 269/131

[56]            References Cited
          U.S. PATENT DOCUMENTS

| | | | |
|---|---|---|---|
| 2,580,231 | 12/1951 | Lamm | 248/67.7 |
| 3,253,083 | 5/1966 | Timbers | 248/49 X |
| 3,627,300 | 12/1971 | Caveney | 269/131 |
| 3,877,134 | 4/1975 | Shanahan | 29/DIG. 47 X |
| 3,883,929 | 5/1975 | Fortsch | 24/509 X |
| 3,991,960 | 11/1976 | Tanaka | 24/458 X |
| 4,029,277 | 6/1977 | Bulanda | 269/131 |
| 4,445,656 | 5/1984 | Leitch | 248/49 |

Primary Examiner—J. Franklin Foss
Attorney, Agent, or Firm—Shoemaker and Mattare, Ltd.

[57]            ABSTRACT

A one-piece clamp includes a unitary body having a bottom panel, end panels and top panels movably connected to the end panels and to each other. A pair of top cross-panels are end mounted on the top panels and are brought into co-planar, end-to-end orientation when the top panels are moved into end contact with the bottom panel. The body can be extrusion molded and cut to any desired length.

6 Claims, 4 Drawing Figures

ONE-PIECE CLAMP

BACKGROUND OF THE INVENTION

The present invention relates in general to clamps, and, more particularly, to unitary, one-piece, all purpose clamps.

There are devices for supporting cords or other bodies on machines, or the like, see, for example, U.S. Pat. Nos. 3,485,467, 3,659,319 and 4,023,758; however, such devices do not exert a positive holding action and are difficult to manufacture and often require several elements to effect a locking action.

There are also devices for holding IV tubing or the like which effect a clamping action, see, for example, U.S. Pat. No. 3,698,681. However, these devices also are complex and difficult to manufacture and are intended for special applications only. These devices also require interengagement of several parts to effect the locking function.

Other fastener devices for supporting elongate bodies are disclosed in U.S. Pat. Nos. 3,991,960, 3,417,438, 3,429,985, 3,444,596 and 3,670,369. However, all of these devices have drawbacks similar to those discussed above.

SUMMARY OF THE INVENTION

The clamp embodying the teachings of the present invention includes a flexible, one-piece body, which can be plastic or the like, with hinges molded thereinto. The clamp can be extrusion molded, then cut to any length as desired.

The clamp can be used to hold: wires together or to an anchoring base, such as a car body or the like; a towel to a wall; a tool to a wall; clothes together during a wash cycle; pieces of paper together; or the like.

The device includes a plurality of rectangular planar body portions hinged together at several corners and static at the remaining corners. The clamp includes a bottom panel with end panels integrally attached thereto at an acute angle therewith to be inwardly inclined toward each other, with a pair of top panels flexibly and integrally attached to the end panels. A pair of top cross-panels are end mounted on the top panels and are brought into a co-planar end-to-end orientation when the top panels are moved toward the base bottom panel. The inwardly inclined end panels prevent the top panels from returning to the open position and objects are thus held in place in a plurality of chambers defined within the closed clamp. The clamp is opened by reversing the above process, which can be effected by hand, or by simply pulling upwardly on the objects held in the clamp.

The base panel can be adhered to another object to mount the clamp on that object.

OBJECTS OF THE INVENTION

It is a main object of the present invention to provide a clamp which is easily manufactured.

It is another object of the present invention to provide a clamp which is easily adaptable to a wide variety of uses.

It is still another object of the present invention to provide a clamp which is easily used.

It is yet another object of the present invention to provide a clamp which is self-contained.

These together with other objects and advantages which will become subsequently apparent reside in the details of construction and operation as more fully hereinafter described and claimed, referece being had to the accompanying drawings forming part hereof, wherein like reference numerals refer to like parts throughout.

DETAILED DESCRIPTION OF THE INVENTION

Figure 1:
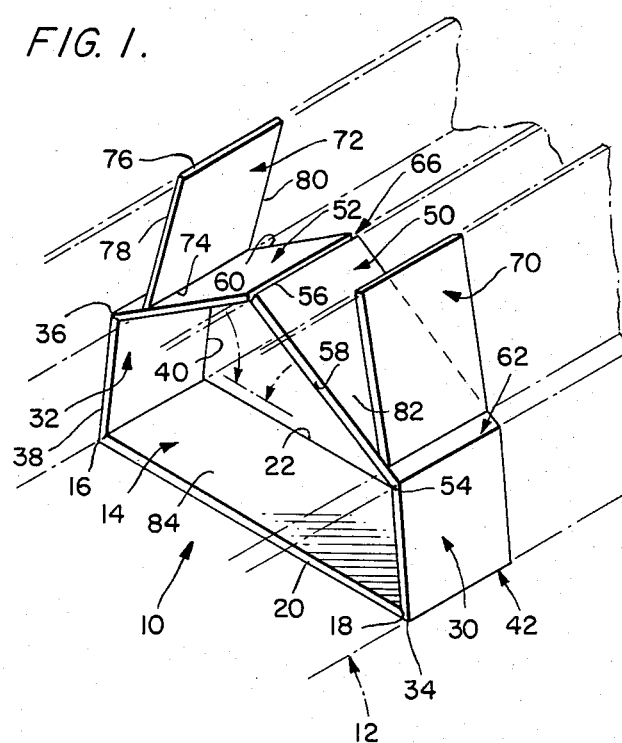
FIG. 1 is a perspective view of a clamp embodying the teachings of the present invention which is cut from an extrusion.

Shown in the figures is a clamp 10. The clamp can be formed by extrusion methods whereby a unit 12 of undetermind length is formed, and a portion thereof is cut off that unit to form the clamp 10. Thus, clamps of any length can be made.

The clamp 10 is unitary and one-piece and includes an elongate bottom panel 14 preferably having a rectangular shape with end edges 16 and 18 and side edges 20 and 22.

A pair of side panels 30 and 32 are elongate and preferably rectangular in shape. Each of the side panels includes end edges 34 and 36 and side edges 38 and 40, with end edges 34 integrally connected to the base end edges to define a corner 42 having an acute angle b so that the side panels are inclined toward each other from the botton panel 14.

A pair of top panels 50 and 52 are elongate and preferably rectangular in shape. Each of these top panels includes end edges 54 and 56 and side edges 58 and 60, with end edges 54 integrally connected to a side panel end edge 36. The connection between the panel end edges 54 and 36 is a flexible connection to define a living hinge 62 having an angle c defined between the top panel and the side panel which varies as necessary. The top panels are also flexibly connected together at ends 56 thereof to form a living hinge 66 having an angle which varies as required and which allows the top panels to move from a relative orientation shown in FIG. 1 to that relative orientation shown in FIG. 4.

A pair of top cross-panels 70 and 72 are elongate and preferably rectangular in shape. Each of these top cross-panels includes end edges 74 and 76 and side edges 78 and 80, with end edges 74 being integrally connected to the top surfaces 82 of the corresponding top panels.

Figure 4:
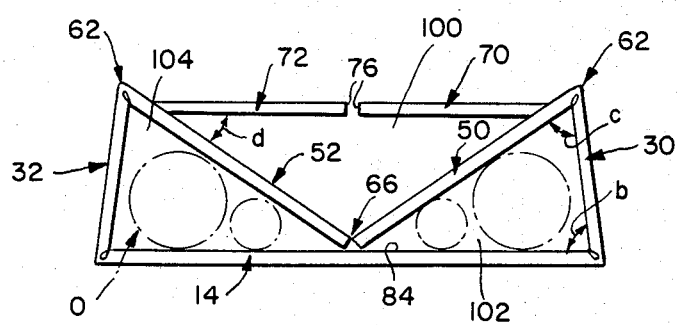
FIG. 4 is an end view of the clamp as shown in FIG. 3.

As best shown in FIG. 4, the top cross-panels are each mounted on the top panels at a location spaced from the hinges 62 and each forms an angle d with such top panel. The angles d are constant.

Figure 2:
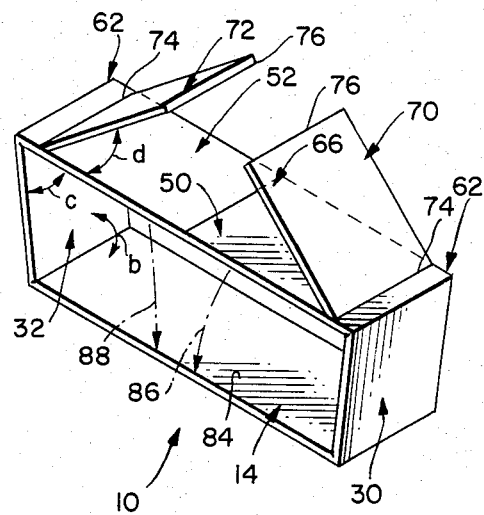
FIG. 2 is a perspective of a clamp embodying the teachings of the present invention showing a first step in a use of that clamp.
Figure 3:
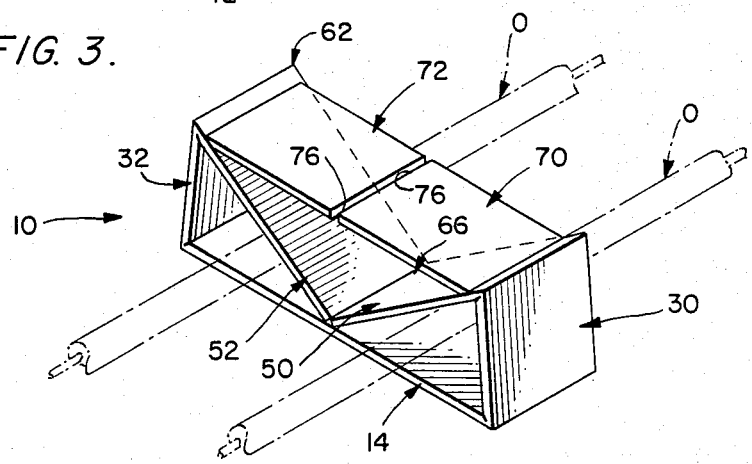
FIG. 3 is a perspective of a clamp embodying the teachings of the present invention showing the clamp in an operative orientation.

Operation of the clamp is illustrated in the figures. A suitable length for the clamp is selected, and the extrusion unit 12 is cut accordingly as best indicated in FIG. 1. The clamp is then flexed as indicated in FIGS. 2 and 3 by forcing edges 56 of the top panels 50 and 52 toward the bottom panel surface 84 as indicated by arrows 86 and 88 in FIG. 2. The top panels pivot about the hinges 62, thereby varying angles c with the end panels being inclined inwardly toward each other, as best shown in FIG. 4. The top panel end edges abut the bottom panel surface 84, and the angles d are selected and the cross-panels are mounted so that when the top panel end edges contact the bottom panel surface 84, the top cross-panels are essentially co-planar with each other and essentially parallel with the bottom panel. The inward inclination of the end panels biases the clamp into the FIG. 1 or the FIG. 4 orientation as suitable. The clamp thus acts as a sort of over-center clamp which is biased either open or closed according to the orientation of the top panels with respect to the plane containing the hinges 62, either above that plane (FIG. 1, open) or below that plane (FIG. 3, closed).

With the clamp in the FIG. 4 clamping configuration, objects, such as object O, are held in compartments, such as triangular compartments identified as central compartment 100, or side compartments, such as compartments 102 or 104, or between the aligned end edges 76 of the cross-panels. Objects such as papers, clothes, or the like, can be held between the aligned end edges 76.

The objects can be released by simply pulling the top panels upwardly either by hand or by using the objects held in the compartments, and moving the top panels away from the bottom panel in a direction opposite from that indicated by arrows 86 and 88 in FIG. 2, thereby reversing the above-described process.

As this invention may be embodied in several forms without departing from the spirit or essential characteristics thereof, the present embodiment is, therefore, illustrative and not restrictive, since the scope of the invention is defined by the appended claims rather than by the description preceding them, and all changes that fall within the metes and bounds of the claims or that form their functional as well as conjointly cooperative equivalents are, therefore, intended to be embraced by those claims.

I claim:

1. A clamp comprising:
   a unitary, one-piece body having an elongate bottom panel which includes side edges and end edges, a pair of elongate side panels each including side edges and end edges one of which is integrally attached to a corresponding one of said bottom panel end edges to form a corner, a pair of elongate top panels each including side edges and end edges one end edge of which is integrally and flexibly attached to another end edge of a corresponding one of said side panels to form a hinge, and a pair of elongate top crosspanels each including side edges and end edges one of which is integrally attached to a corresponding one of said top panels to form an angle therewith;
   said top panels being hingably connected together at the other said end edges thereof; and
   said top cross-panels being located and said angles being selected so that when said top panels are oriented to have the other of their respective end edges contacting said bottom panel, said top cross-panels will be essentially co-planar and have the other of their respective end edges located closely adjacent to each other.

2. The clamp defined in claim 1 wherein said body is part of an extruded unit of indefinite length.

3. The clamp defined in claim 1 wherein all of said side edges are essentially co-planar.

4. The clamp defined in claim 1 wherein said side panels converge toward each other from said bottom panel.

5. The clamp defined in claim 4 wherein said corners are flexible to permit said side panels to move with respect to each other and with respect to said bottom panel.

6. The clamp defined in claim 5 wherein each top panel is approximately one-half as long as said bottom panel.

* * * * *